(12) United States Patent
Takahashi

(10) Patent No.: US 11,449,031 B2
(45) Date of Patent: Sep. 20, 2022

(54) PARAMETER UPDATING METHOD, PARAMETER UPDATING SYSTEM, AND STORAGE MEDIUM STORING PROGRAM

(71) Applicant: BROTHER KOGYO KABUSHIKI KAISHA, Nagoya (JP)

(72) Inventor: Eisuke Takahashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 549 days.

(21) Appl. No.: 16/168,183

(22) Filed: Oct. 23, 2018

(65) Prior Publication Data

US 2019/0129385 A1  May 2, 2019

(30) Foreign Application Priority Data

Nov. 1, 2017 (JP) .............................. JP2017-211941

(51) Int. Cl.
  *G05B 19/414* (2006.01)
  *G05B 19/416* (2006.01)
  *G05B 19/404* (2006.01)

(52) U.S. Cl.
  CPC ......... *G05B 19/414* (2013.01); *G05B 19/404* (2013.01); *G05B 19/416* (2013.01);
  (Continued)

(58) Field of Classification Search
  None
  See application file for complete search history.

(56) References Cited

U.S. PATENT DOCUMENTS

2003/0036868 A1* 2/2003 Yutkowitz ............ G05B 19/404
  702/105
2005/0221514 A1* 10/2005 Pasadyn ................ G05B 17/02
  438/14
(Continued)

FOREIGN PATENT DOCUMENTS

JP    2009-003817 A    1/2009
JP    2011-072178 A    4/2011
(Continued)

OTHER PUBLICATIONS

Official Action issued in counterpart JP patent application No. 2017-211941 dated Jul. 6, 2021 together with English language translation.

*Primary Examiner* — Mohammad Ali
*Assistant Examiner* — David Earl Ogg
(74) *Attorney, Agent, or Firm* — Scully, Scott, Murphy & Presser, PC

(57) ABSTRACT

A method includes: acquiring time-series data of a control input and a control output; calculating a variable parameter that minimizes an evaluation function, based on observation values of the control input and the control output; and updating the variable parameter with the calculated variable parameter. The evaluation function includes: a first function part that evaluates an entire error that is a control error of the entire observation period and increases the output value as the entire error increases; and at least one of: a second function part that evaluates a sectional error that is a control error of a particular section in the observation period and increases the output value as the sectional error increases; and a third function part that evaluates an instantaneous error that is a control error of a particular time point in the observation period and increases the output value as the instantaneous error increases.

8 Claims, 9 Drawing Sheets

(52) U.S. Cl.
CPC .............. *G05B 2219/25124* (2013.01); *G05B 2219/36103* (2013.01); *G05B 2219/37373* (2013.01); *G05B 2219/45187* (2013.01)

(56) References Cited

U.S. PATENT DOCUMENTS

| | | | | |
|---|---|---|---|---|
| 2008/0161946 | A1* | 7/2008 | Kubota | H04Q 9/00 |
| | | | | 700/90 |
| 2008/0195236 | A1* | 8/2008 | Koo | G05B 13/024 |
| | | | | 700/42 |
| 2009/0302797 | A1* | 12/2009 | Nakagawa | G05B 19/416 |
| | | | | 318/632 |
| 2011/0050146 | A1 | 3/2011 | Okita et al. | |
| 2015/0008861 | A1* | 1/2015 | Sonoda | H02P 21/20 |
| | | | | 318/504 |
| 2016/0039092 | A1* | 2/2016 | Harada | B25J 9/1679 |
| | | | | 700/193 |
| 2017/0090444 | A1* | 3/2017 | Takahashi | G05B 13/024 |
| 2017/0199510 | A1 | 7/2017 | Fujita et al. | |

FOREIGN PATENT DOCUMENTS

| | | |
|---|---|---|
| JP | 2015-018388 A | 1/2015 |
| JP | 5968572 B1 | 8/2016 |
| JP | 2017-068658 A | 4/2017 |

\* cited by examiner

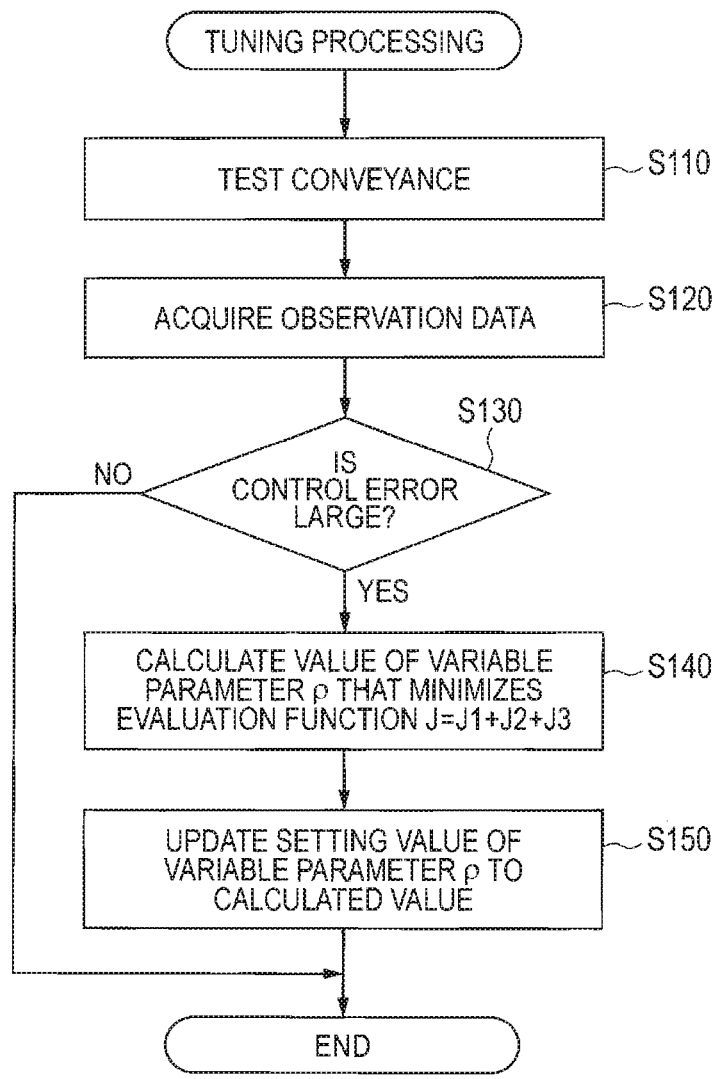

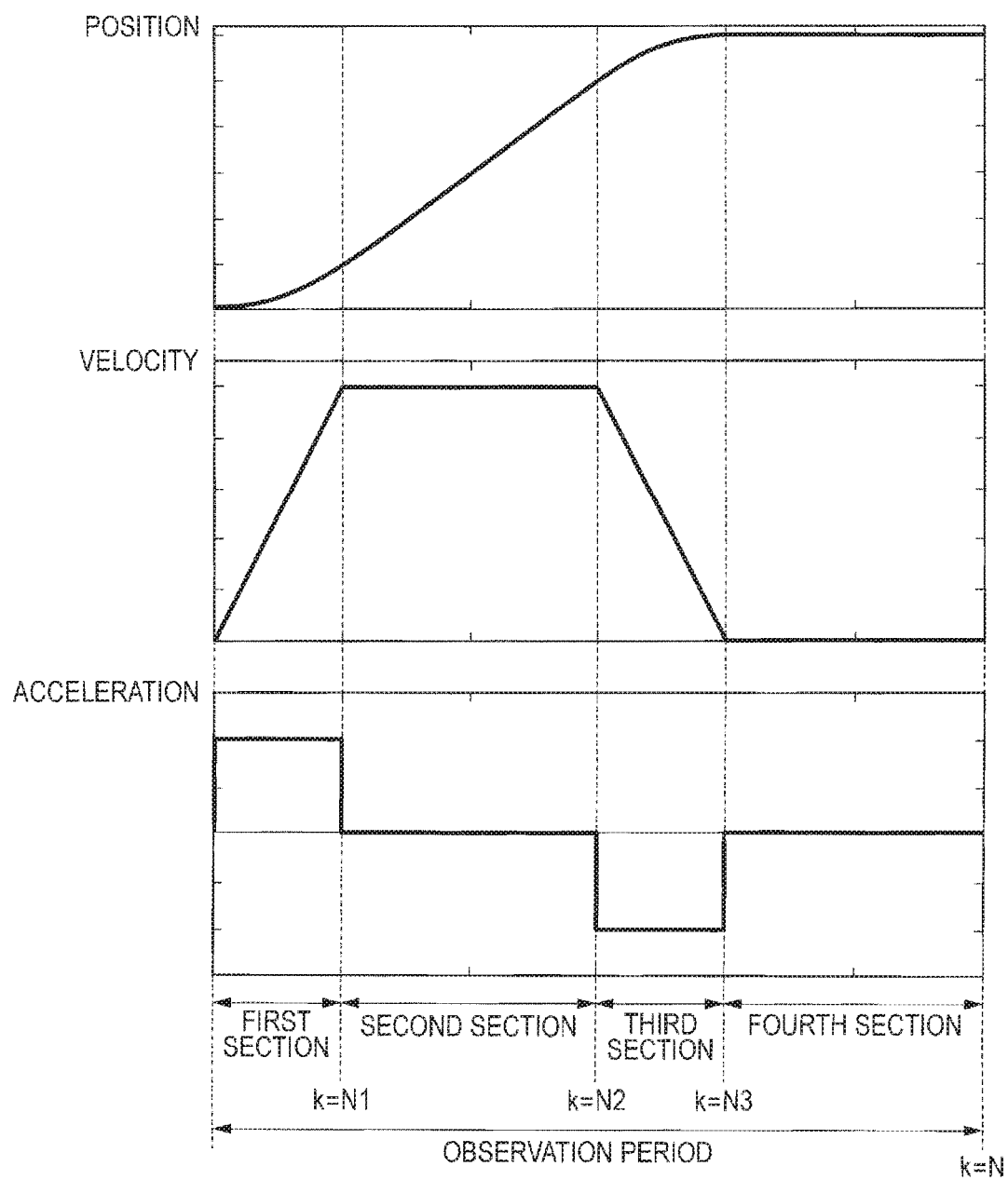

PARAMETER UPDATING METHOD, PARAMETER UPDATING SYSTEM, AND STORAGE MEDIUM STORING PROGRAM

CROSS REFERENCE TO RELATED APPLICATIONS

This application claims priority from Japanese Patent Application No. 2017-211941 filed Nov. 1, 2017. The entire content of the priority application is incorporated herein by reference.

TECHNICAL FIELD

This disclosure relates to a parameter updating method, a parameter updating system, and a storage medium storing program.

BACKGROUND

Conventionally, as an automatic adjustment technology for a controller, a FRIT (Fictitious Reference Iterative Tuning) technology and a VRFT (Virtual Reference Feedback Tuning) technology are known. A technology is also known in which a control input for the observation value of a control output is computed from the observation value of the control output by use of an inverse model of a plant, the control input computed from the observation value of the control output is compared with the observation value of the control input and accordingly, a control error is estimated.

SUMMARY

However, in the above-described technology, since the control error is evaluated based on the time-series data of the control input and the control output for entire control results indicated by the time-series data, and thus the parameters of the controller are updated, it is impossible to appropriately address a control error which occurs due to a temporary cause to update the parameters of the controller. Examples of the control error which occurs due to a temporary cause include a control error caused by a frictional force at the time of start of movement.

Hence, according to one aspect of this disclosure, it is preferable to provide a technology for realizing the updating of the parameters of a controller with consideration given to a control error which occurs due to a temporary cause.

According to one aspect, this specification discloses a parameter updating method. The method includes: acquiring time-series data of a control input and a control output that are observed when a controlled object is controlled by a controller, the controller being configured to calculate, based on the control output, the control input following a particular transfer function having a variable parameter and to control the controlled object based on the control input; calculating a value of the variable parameter that minimizes an output value of an evaluation function relating to a control error, based on an observation value of the control input and an observation value of the control output at each time in an observation period identified from the acquired time-series data; and updating a setting value of the variable parameter with the calculated value of the variable parameter. The evaluation function includes: a first function part configured to evaluate an entire error that is a control error of an entirety of the observation period based on the observation value at each time in the observation period and to increase the output value as the entire error increases; and at least one of: a second function part configured to evaluate a sectional error that is a control error of a particular section in the observation period based on the observation value at each time in the particular section and to increase the output value as the sectional error increases; and a third function part configured to evaluate an instantaneous error that is a control error of a particular time point in the observation period based on the observation value at the particular time point and to increase the output value as the instantaneous error increases.

According to another aspect, this specification also discloses a parameter updating system. The parameter updating system includes a processor configured to perform: acquiring time-series data of a control input and a control output that are observed when a controlled object is controlled by a controller, the controller being configured to calculate, based on the control output, the control input following a particular transfer function having a variable parameter and to control the controlled object based on the control input; calculating a value of the variable parameter that minimizes an output value of an evaluation function relating to a control error, based on an observation value of the control input and an observation value of the control output at each time in an observation period identified from the acquired time-series data; and updating a setting value of the variable parameter with the calculated value of the variable parameter. The evaluation function includes: a first function part configured to evaluate an entire error that is a control error of an entirety of the observation period based on the observation value at each time in the observation period and to increase the output value as the entire error increases; and at least one of: a second function part configured to evaluate a sectional error that is a control error of a particular section in the observation period based on the observation value at each time in the particular section and to increase the output value as the sectional error increases; and a third function part configured to evaluate an instantaneous error that is a control error of a particular time point in the observation period based on the observation value at the particular time point and to increase the output value as the instantaneous error increases.

According to still another aspect, this specification also discloses a non-transitory computer-readable storage medium storing a program executable on a computer. The program causes, when executed, the computer to perform operations including: acquiring time-series data of a control input and a control output that are observed when a controlled object is controlled by a controller, the controller being configured to calculate, based on the control output, the control input following a particular transfer function having a variable parameter and to control the controlled object based on the control input; calculating a value of the variable parameter that minimizes an output value of an evaluation function relating to a control error, based on an observation value of the control input and an observation value of the control output at each time in an observation period identified from the acquired time-series data; and updating a setting value of the variable parameter with the calculated value of the variable parameter. The evaluation function includes: a first function part configured to evaluate an entire error that is a control error of an entirety of the observation period based on the observation value at each time in the observation period and to increase the output value as the entire error increases; and at least one of: a second function part configured to evaluate a sectional error that is a control error of a particular section in the observation period based on the observation value at each time in the particular section and to increase the output value as the sectional error increases; and a third function part configured to evaluate an instantaneous error that is a control error of a particular time point in the observation period based on the observation value at the particular time point and to increase the output value as the instantaneous error increases.

BRIEF DESCRIPTION OF THE DRAWINGS

Embodiments in accordance with this disclosure will be described in detail with reference to the following figures wherein:

FIG. 6 is a flowchart showing tuning processing which is executed by a main unit (parameter updater);

FIG. 11 is a diagram for illustrating a method of dividing an observation period into a plurality of sections, according to a modification.

DETAILED DESCRIPTION

Some aspects of this disclosure will be described while referring to the attached drawings. Here, an example will be described in which a parameter updating method according to this disclosure is applied to an image forming system for ejecting ink droplets to paper Q so as to form an image on the paper Q. However, the technology according to this disclosure is not limited to the application to the image forming system and is applied to various systems.

Figure 1:
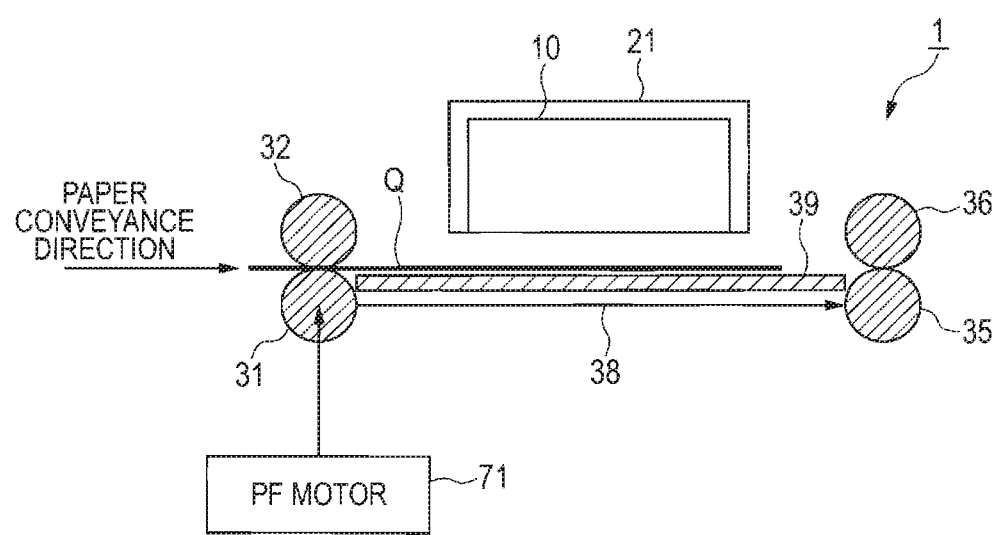
FIG. 1 is a schematic cross-sectional view around a paper conveyance mechanism in an image forming system.

An image forming system 1 shown in FIG. 1 is configured as an inkjet printer. The image forming system 1 includes a recording head 10. The recording head 10 is mounted on a carriage 21. The carriage 21 reciprocates in a main scan direction (the normal direction to the plane of FIG. 1) perpendicular to a paper conveyance direction so as to move the recording head 10 in the main scan direction.

As with a well-known inkjet printer, the image forming system 1 repeatedly executes the conveyance control of the paper Q in which a particular amount of the paper Q is conveyed and is then stopped, and thereby intermittently conveys the paper Q below the recording head 10 every particular amount. When the paper Q is stopped, the carriage 21 is moved in the main scan direction, and the recording head 10 ejects the ink droplets. In this way, an image is formed in the main scan direction on the paper Q each time the paper Q is conveyed intermittently. The image forming system 1 repeatedly executes such an operation so as to form the image on the entire paper Q.

The paper Q receives the action of a force from a conveyance roller 31 and a paper discharge roller 35 so as to be conveyed from the upstream side to the downstream side of a platen 39 located below the recording head 10. The paper conveyance direction is perpendicular to the rotation shafts of the conveyance roller 31 and the paper discharge roller 35. The conveyance roller 31 is disposed opposite a follow roller 32 on the upstream side of the platen 39, and the paper discharge roller 35 is disposed opposite a follow roller 36 on the downstream side of the platen 39.

The conveyance roller 31 is driven by a PF motor 71 so as to be rotated. The PF motor 71 is a direct-current motor. The conveyance roller 31 is rotated in a state in which the paper Q is sandwiched between the conveyance roller 31 and the follow roller 32 so as to convey the paper Q to the downstream side. The paper discharge roller 35 is connected through a connection mechanism 38 to the conveyance roller 31, and receives power from the PF motor 71 through the conveyance roller 31 and the connection mechanism 38 so as to be rotated synchronously with the conveyance roller 31. The paper discharge roller 35 is rotated in a state in which the paper Q is sandwiched between the paper discharge roller 35 and the follow roller 36 so as to further convey the paper Q approaching from the side of the conveyance roller 31 along the platen 39 to the downstream side.

Figure 2:
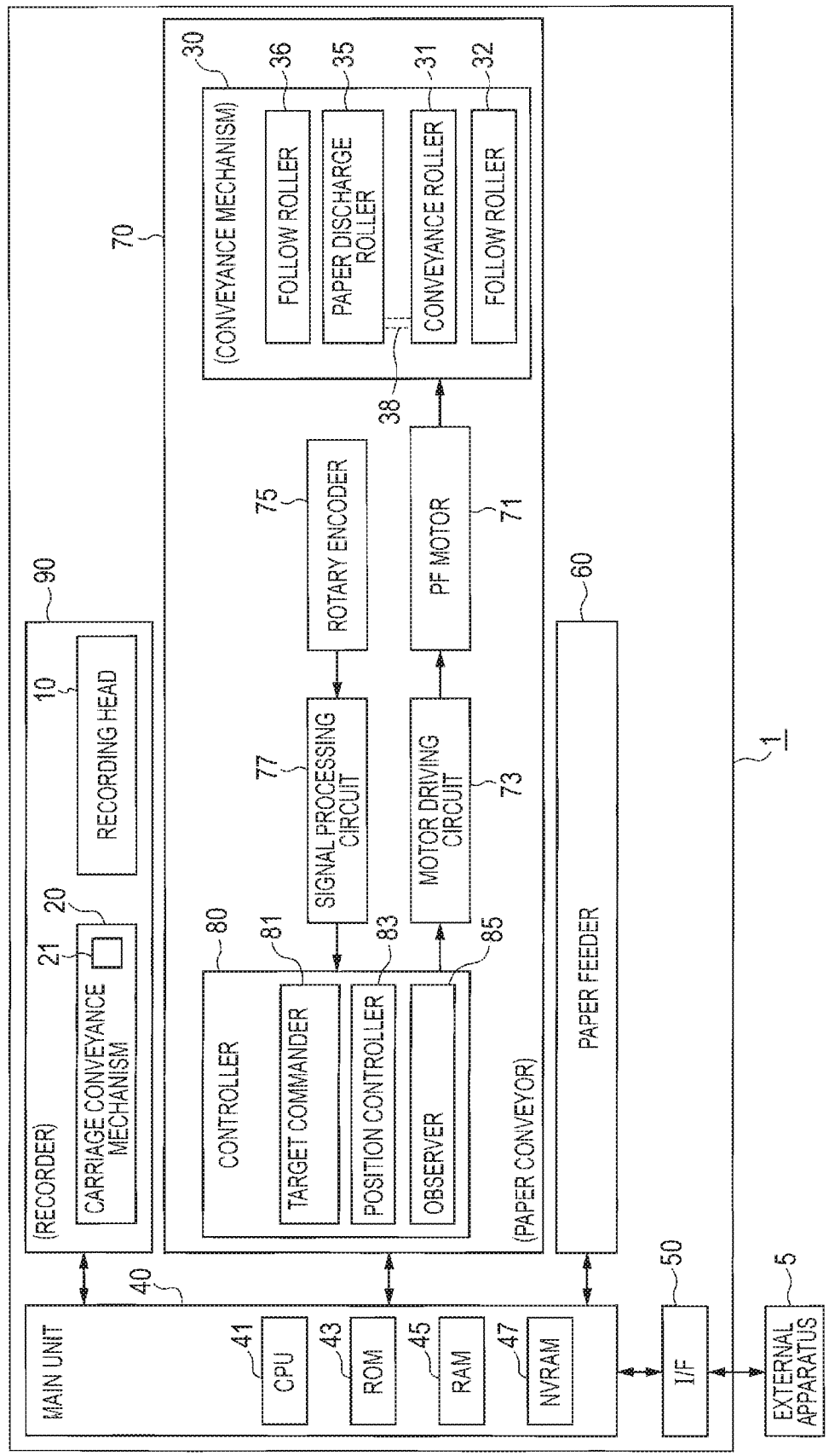
FIG. 2 is a block diagram showing the electrical configuration of the image forming system.

As shown in FIG. 2, the image forming system 1 of the present embodiment includes a main unit 40, a communication interface 50, a paper feeder 60, a paper conveyor 70, and a recorder 90. The main unit 40 includes a CPU 41, a ROM 43, a RAM 45 and an NVRAM 47 so as to comprehensively control the image forming system 1. The CPU 41 executes processing according to programs stored in the ROM 43. The RAM 45 is used as a working memory when the processing is executed by the CPU 41. The NVRAM 47 is a nonvolatile memory in which data is electrically rewritable, and stores data which needs to be held after the power of the image forming system 1 is turned off.

The main unit 40 inputs commands to the paper feeder 60, the paper conveyor 70 and the recorder 90 such that when the main unit 40 receives print target data through the communication interface 50 from an external apparatus 5, an image based on the print target data is formed on the paper Q.

The paper feeder 60 conveys, according to the command from the main unit 40, the paper Q from an unillustrated paper feed tray to the nip position of the paper Q between the conveyance roller 31 and the follow roller 32. The paper conveyor 70 intermittently conveys, according to the command from the main unit 40, the paper Q supplied from the paper feeder 60 to an image forming position below the recording head 10.

When the paper Q intermittently conveyed by the paper conveyor 70 is stopped, the recorder 90 makes, according to the command from the main unit 40, the recording head 10 execute an operation of ejecting the ink droplets based on the print target data while moving the carriage 21 in the main scan direction. In this way, image forming on the paper Q in the main scan direction is executed. The recorder 90 includes the recording head 10 and a carriage conveyance mechanism 20 which moves (reciprocates) the carriage 21 on which the recording head 10 is mounted in the main scan direction.

Specifically, when the main unit 40 receives the print target data, the main unit 40 controls the paper feeder 60 and the paper conveyor 70 to convey the front end of the paper Q to the image forming position below the recording head 10, and then controls the recorder 90 to move the carriage 21 (the recording head 10) in the main scan direction so as to execute the image forming operation on the paper Q.

Thereafter, the main unit 40 sets a target locus r(t) for the paper conveyor 70, controls the paper conveyor 70 to convey the paper Q by a particular amount according to the target locus r(t) and, after the completion of the conveyance, controls the recorder 90 to execute the image forming operation on the paper Q.

After the completion of the image forming operation, the main unit 40 controls the paper conveyor 70 to execute again the conveyance operation of the paper Q according to the target locus r(t). Thereafter, the main unit 40 controls the recorder 90 to execute again the image forming operation on the paper Q. As described above, the main unit 40 controls the paper conveyor 70 and the recorder 90 to execute the processing described above alternatively and repeatedly so as to form, on the paper Q, the image based on the print target data.

The paper conveyor 70 includes a conveyance mechanism 30, the PF motor 71, a motor driving circuit 73, a rotary encoder 75, a signal processing circuit 77, and a controller 80. The conveyance mechanism 30 is the conveyance mechanism of the paper Q, and includes the conveyance roller 31, the follow roller 32, the paper discharge roller 35, the follow roller 36, the connection mechanism 38, and the platen 39 described above. In the conveyance mechanism 30, the conveyance roller 31 and the paper discharge roller 35 receive power from the PF motor 71 so as to be rotated, and thus the conveyance operation of the paper Q is realized.

The PF motor 71 is driven by the motor driving circuit 73 so as to drive and rotate the conveyance roller 31. The motor driving circuit 73 applies, to the PF motor 71, a drive current (or a drive voltage) corresponding to a manipulated variable u which is input from the controller 80 so as to drive the PF motor 71.

The rotary encoder 75 is configured similarly to a well-known rotary encoder, and outputs, as encoder signals, A-phase and B-phase pulse signals corresponding to the rotation of the conveyance roller 31. The rotary encoder 75 is provided, for example, in a power transmission path between the PF motor 71 and the conveyance roller 31.

Based on the encoder signals input from the rotary encoder 75, the signal processing circuit 77 measures a rotational position y and a rotational velocity v of the conveyance roller 31. In the following description, the rotational position y which is measured is expressed as an observation value ym of the rotational position y or a rotational position ym, and the rotational velocity v which is measured is expressed as an observation value vm of the rotational velocity v or a rotational velocity vm. The signal processing circuit 77 is configured to input the rotational position ym and the rotational velocity vm to the controller 80.

Figure 3:
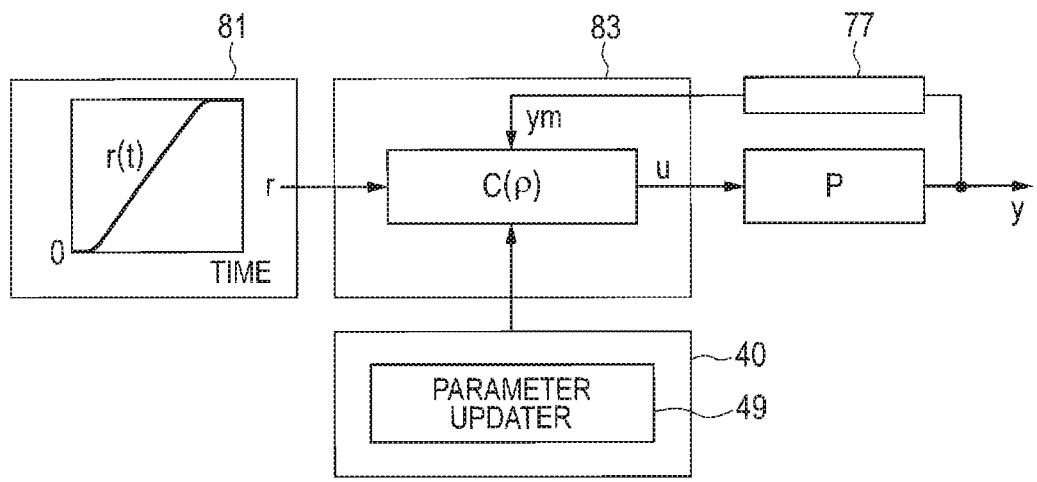
FIG. 3 is a block diagram showing a position controller and a parameter updater.

The controller 80 includes a target commander 81, a position controller 83, and an observer 85. As shown in FIG. 3, according to the target locus r(t) provided from the main unit 40, the target commander 81 is configured to input, to the position controller 83, a desired value r at each time t=k after the start of the control.

The target locus r(t) which is set by the main unit 40 when the paper Q is intermittently conveyed indicates a position locus for conveying the paper Q to a target stop position after the start of the control and thereafter maintaining the stop state of the paper Q. As an example, the target locus r(t) indicates a locus in which the desired value r is monotonically increased from a value r=0 corresponding to the position at the time of the start of the control to a value r=ys corresponding to the target stop position, and thereafter the desired value r is kept at the value r=ys. As another example, the target locus r(t) may be the constant value r=ys which corresponds to the target stop position. The position controller 83 performs drive control of the PF motor 71 according to the target locus r(t), and thus the paper Q is conveyed by the particular amount by the rotation of the conveyance roller 31.

Specifically, the position controller 83 is configured to input, to the motor driving circuit 73, the manipulated variable u which corresponds to the desired value r input from the target commander 81 and the rotational position ym input from the signal processing circuit 77. P shown in FIG. 3 represents a transfer function P of a control target, and satisfies a relational formula y=P·u. The position controller 83 computes, according to a preset transfer function $C(\rho)$, the manipulated variable u corresponding to the desired value r and the rotational position ym. By the operation described above, the position controller 83 performs feedback control of the PF motor 71 such that the paper Q is conveyed by the particular amount by the rotation of the conveyance roller 31.

The transfer function $C(\rho)$ of the position controller 83 used for the calculation of the manipulated variable u includes a variable parameter $\rho$ which is set by the main unit 40, and the variable parameter $\rho$ is adjusted by the main unit 40. The main unit 40 functions as a parameter updater 49 which updates the setting value of the variable parameter $\rho$ by the execution of a program by the CPU 41.

The observer 85 is configured to collect, for a certain period, based on a command from the main unit 40, a pair of a value um which is input by the position controller 83 as the manipulated variable u to the motor driving circuit 73 and the observation value ym of the rotational position y which is obtained from the signal processing circuit 77 in response to the input of the manipulated variable u, and provide observation data including the collected information to the main unit 40. In the following description, the value um is also expressed as the observation value um of the manipulated variable u or the manipulated variable um. The collection period of the rotational position ym and the manipulated variable um is also expressed as an observation period. The observation data is the time-series data of the rotational position ym and the manipulated variable um which is formed by a combination of the rotational position ym and the manipulated variable um at each time in the observation period.

Based on the observation data described above, the main unit 40 updates the setting value of the variable parameter $\rho$. The main unit 40 functions as the parameter updater 49 so as to update the setting value of the variable parameter $\rho$ when a specific condition is satisfied such as the time when the power of the image forming system 1 is turned on. The setting value after being updated is stored in the NVRAM 47.

Next, the details of the position controller 83 and a method of updating the variable parameter $\rho$ will be described. The position controller 83 of the present embodiment is configured to control the rotational position y of the conveyance roller 31 by performing internal model control (IMC).

Figure 4:
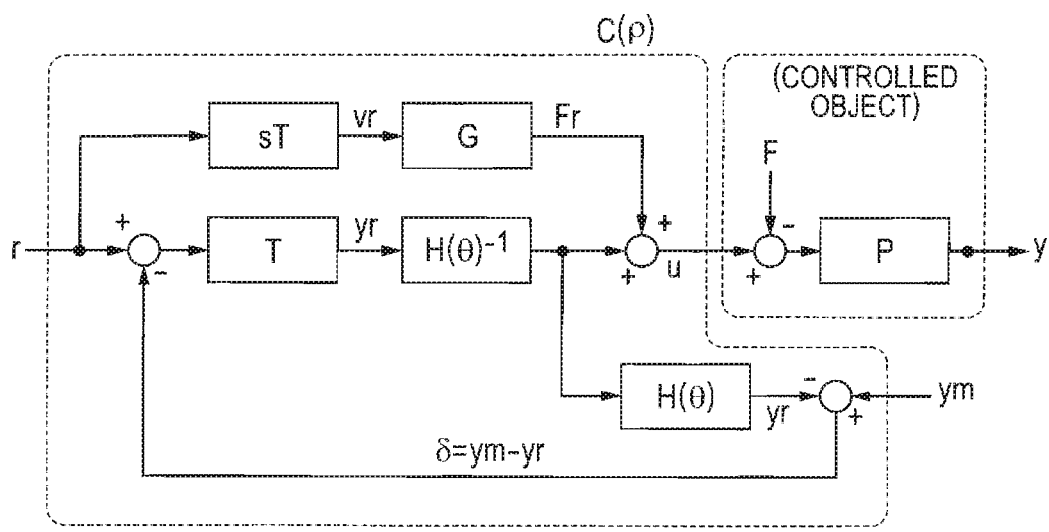
FIG. 4 is a block diagram showing the detailed configuration of the position controller.

As shown in FIG. 4, the position controller 83 is configured to calculate the manipulated variable u corresponding to the desired value r and the rotational position ym according to the transfer function $C(\rho)$ which includes, as elements, a target response function T, a velocity estimation function sT, a transfer function H(θ) of the control target, an inverse model H$^{-1}$ (θ) thereof, and a friction estimation function G.

Based on a value (r−δ) obtained by correcting the desired value r with a difference δ=ym−yr between the rotational position ym that is the observation value of a control output and the corresponding target response yr, the position controller 83 calculates a control input u according to a relational formula u=H$^{-1}$ (θ) T (r−δ)+Fr.

The value Fr is an output value of the friction estimation function G which is an estimated model of a frictional force F acting on the control target, and is an estimated value of the frictional force F. The value Fr is obtained by inputting, to the friction estimation function G, an estimated value yr of the rotational velocity v of the conveyance roller 31 obtained by inputting the desired value r to the velocity estimation function sT (Fr=G(vr)).

The transfer function H(θ) is a transfer function of the control target that is modeled in an environment in which the true transfer function P of the control target is unknown, and includes a variable parameter θ. The inverse model H$^{-1}$ (θ) is the inverse model of the transfer function H(θ). As described above, an internal model control system includes, therein, the transfer function H(θ) of the control target that is modeled. The target response function T outputs the target response yr which is the control output (the rotational position y) that should be realized in response to the input value (r−δ).

Specifically, the transfer function H of the control target which includes the conveyance roller 31 of the present embodiment is defined according to a kinetic model of a mass damper system.

$$H = \frac{1}{s}\left(\frac{1}{Ms+D}\right)$$

Here, M represents a mass, D represents a damping coefficient and s represents a Laplace operator. In this case, the variable parameter θ is the mass M and the damping coefficient D, that is, θ=(M, D).

The frictional force F acting on the control target is estimated based on a coulomb friction model including a Stribeck effect, and the estimated value Fr of the frictional force F is calculated according to the following function G corresponding to this model.

$$F_r = G(v_r) = \{f_c + (f_b - f_c)\exp(-C|v_r|)\}\text{sign}(v_r)$$

Here, fc represents a coulomb frictional force, fb represents a static frictional force and C represents a damping coefficient in a transitional period from static friction to coulomb friction. Here, exp represents an exponential function, and sign represents a signum function. In this case, the friction estimation function G includes fc, fb and C as variable parameters. In other words, the variable parameter ρ of the transfer function C(ρ) is ρ={θ, fc, fb, C}.

Figure 5A:
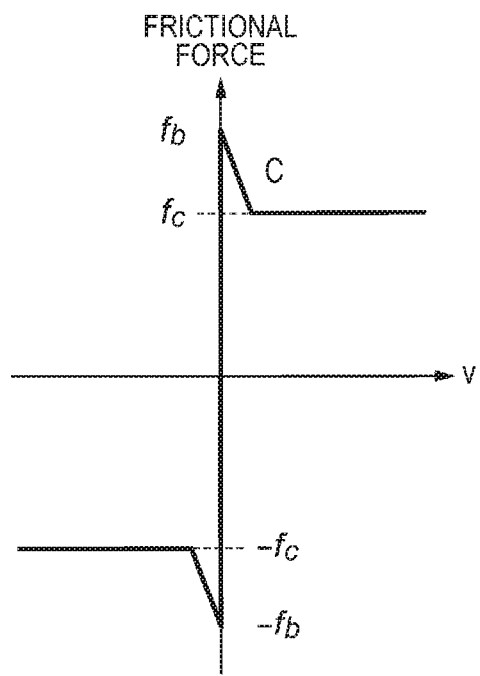
FIGS. 5A and 5B are illustrative diagrams on friction models.
Figure 5B:
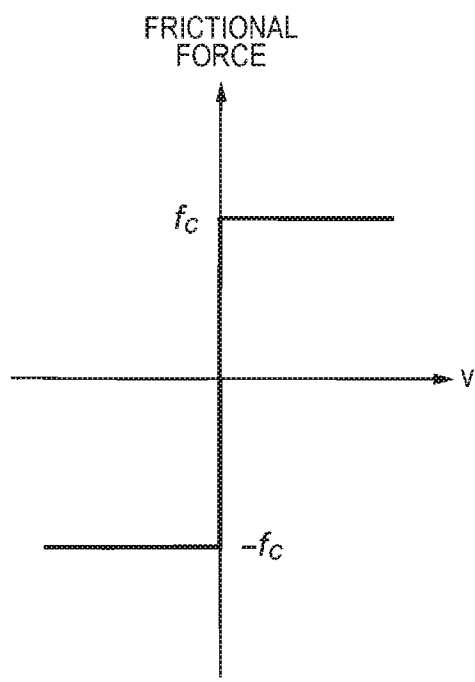

FIG. 5A is a graph which shows changes in the frictional force F according to the coulomb friction model including the Stribeck effect with respect to the velocity v and in which the horizontal axis represents the velocity v and the vertical axis represents the frictional force F. FIG. 5B is a similar graph which shows changes in the frictional force F according to the coulomb friction model without consideration given to the Stribeck effect with respect to the velocity v.

The estimated value Fr of the frictional force F described above may be calculated according to the coulomb friction model without consideration given to the Stribeck effect. In other words, the estimated value Fr of the frictional force F may be calculated according to the following function G.

$$F_r = G(v_r) = f_c \text{ sign}(v_r)$$

While the position controller 83 calculates the manipulated variable u according to the transfer function C(ρ) described above, the main unit 40 (the parameter updater 49) of the present embodiment calculates, based on the observation data, the value of the variable parameter ρ which minimizes the following evaluation function J, and thereby calculate the value of the variable parameter ρ which appropriately reduces a control error. Then, the calculated value is set to the position controller 83.

$$J = J1 + J2 + J3$$

$$J1 = \frac{1}{N}\sum_{k=1}^{N} e(k, \rho)^2$$

$$J2 = \max\left\{\frac{1}{N1}\sum_{k=1}^{k=N1} e(k, \rho)^2, \frac{1}{N2-N1}\sum_{k=N1+1}^{k=N2} e(k, \rho)^2, \ldots\right\}$$

$$J3 = \max\{|e(k, \rho)|\}^2$$

The evaluation function J is a function which evaluates the control error and which outputs a larger value as the control error is increased. The evaluation function J includes a first function part J1, a second function part J2, and a third function part J3.

A value e (k, ρ) included in the evaluation function J corresponds to a deviation of the observation value um (k) of the manipulated variable u from the reference value ur(k) of the manipulated variable u (that is, difference between the observation value um (k) and the reference value ur(k)) at a time k.

$$e(k, \rho) = u_m(k) - u_r(k)$$

The reference value ur(k) of the manipulated variable u at the time k is calculated according to the following formula based on the observation value ym of the control output (the rotational position y).

$$u_r(k) = \left(\frac{1}{H(\theta)}y_m(k) + F_r(k)\right)$$

H$^{-1}$ (θ) is the inverse model of the transfer function H(θ) of the control target which is modeled as described above, and Fr(k) is the estimated value Fr of the frictional force F at the time k. The estimated value Fr(k) is calculated by inputting, to the friction estimation function G, an estimated value vr(k) of the rotational velocity v obtained by differentiating the target response yr obtained by inputting a desired value r(k) at the time k to the target response function T.

For more detailed explanation, the target response yr is expressed as below, based on the block diagram of FIG. 4.

$$y_r = T(r - \delta)$$

$$(1-T)y_r = T(r - y_m)$$

$$y_r = \frac{T}{1-T}(r - y_m)$$

Then, the formula u=H$^{-1}$ (θ) T (r−δ)+Fr can be deformed as below.

$$u = H^{-1}(\theta)T(r - \delta) + F_r$$
$$= H^{-1}(\theta)T(r - y_m + y_r) + F_r$$
$$= H^{-1}(\theta)T\left(r - y_m + \frac{T}{1-T}(r - y_m)\right) + F_r$$
$$= H^{-1}(\theta)\frac{T}{1-T}(r - y_m) + F_r$$

Here, the following relation is satisfied.

$$\bar{r} = \frac{1}{T}y_m$$

Hence, the reference value ur is expressed as below.

$$u_r = H^{-1}(\theta)\frac{T}{1-T}(\bar{r} - y_m) + F_r$$
$$= H^{-1}(\theta)\frac{T}{1-T}\left(\frac{1}{T} - 1\right)y_m + F_r$$
$$= H^{-1}(\theta)y_m + F_r$$

Specifically, the first function part J1 is configured as a function for calculating the mean square of deviations e (k, ρ) at each time k calculated from the manipulated variable um(k) and the rotational position ym(k) indicated by the observation data at each time k which are discrete in an observation period from the time k=1 to the time k=N. In other words, the first function part J1 functions to output a control error in the entire observation period as the mean square of the deviation e (k, ρ) in the observation period. In the following description, the control error in the entire observation period calculated by the first function part J1 is also expressed as the entire error.

The second function part J2 is configured as a function for outputting the maximum value of the mean square of a deviation e (k, ρ) in each section when the observation period from the time k=1 to the time k=N is divided into a plurality of sections. In other words, the second function part J2 functions to calculate, as a control error in each section, the mean square of the deviation e (k, ρ) in each section and output, as a sectional error, the control error (the mean square of the deviation) in the section where the maximum control error is indicated among the control errors (the mean square of the deviation) in each section.

According to the formula described above, the second function part J2 functions to output, as the sectional error, the mean square in the section where the mean square is maximum among the mean squares of the deviations e (k, ρ) in two or more sections obtained by dividing the observation period. The two or more sections include the first section from the time k=1 to the time k=N1 and the second section from the time k=N1+1 to the time k=N2. When the observation period is divided into the first section and the second section, N2=N.

The third function part J3 is configured as a function for calculating, as an instantaneous error in the observation period, the square of an absolute value | e (k, ρ) | at the time when the absolute value | e (k, ρ) | is maximum among the deviations e (k, ρ) at each time k in the observation period.

Hence, the evaluation function J functions so as to output a larger value as the entire error is increased due to the function of the first function part J1, to output a larger value as the sectional error is increased due to the function of the second function part J2 and to output a larger value as the instantaneous error is increased due to the function of the third function part J3.

In the present embodiment, based on the observation data, the variable parameter ρ={θ, fc, fb, C} in which the evaluation function J is minimized is searched for, and thus the setting value of the variable parameter ρ in the position controller 83 is updated so as to reduce the control error.

Specifically, the main unit 40 executes tuning processing shown in FIG. 6 so as to function as the parameter updater 49, and thereby updates the setting value of the variable parameter ρ. As an example, the main unit 40 executes the tuning processing shown in FIG. 6 either each time the power of the image forming system 1 is turned on or periodically. The execution of the tuning processing periodically includes, for example, the execution thereof each time the number of papers printed exceeds a particular number and the execution thereof each time a certain period elapses.

As another example, the main unit 40 executes the tuning processing shown in FIG. 6 each time an execution command is input from a user. The execution command is input from the user through a user interface (unillustrated) provided in the image forming system 1 or through the external apparatus 5. The main unit 40 may be configured to execute the tuning processing shown in FIG. 6 before the shipment of the image forming system 1 according to an instruction of a manufacturer.

When the main unit 40 starts the tuning processing, the main unit 40 controls the paper conveyor 70 to execute the test conveyance of the paper Q by inputting a command to the paper conveyor 70 (S110). The main unit 40 sets the target locus r(t) to the controller 80, and controls the position controller 83 to execute control of the PF motor 71 based on the target locus r(t) and the transfer function C(ρ). The main unit 40 stores the setting value of the variable parameter ρ in the NVRAM 47, and sets the setting value to the position controller 83. Before the test conveyance, the main unit 40 controls the paper feeder 60 to supply the paper Q to the conveyance mechanism 30 by inputting a command to the paper feeder 60.

In the test conveyance, the observer 85 is operated according to a command from the main unit 40, collects a pair of the observation value um of the manipulated variable u and the observation value ym of the rotational position y at each time when the position controller 83 controls the PF motor 71 based on the target locus r(t), and provides the observation data including the collected information to the main unit 40.

The main unit 40 acquires the observation data provided from the observer 85 (S120). Then, based on the observation data, the main unit 40 determines whether the control error is large (S130). Whether the control error is large or small is determined based on, for example, a comparison between the output value of the evaluation function J and a threshold value. When the main unit 40 determines that the control error is large, the processing is transferred to S140 whereas when the main unit 40 determines that the control error is small (No in S130), the main unit 40 determines that the updating of the variable parameter ρ is unnecessary and ends the tuning processing.

When the processing is transferred to S140, the main unit 40 substitutes, into the above-described evaluation function J, the observation value um of the manipulated variable u and the observation value ym of the rotational position y indicated by the observation data acquired in S120, and calculates the value of the variable parameter ρ which minimizes the evaluation function J after the substitution.

Thereafter, the main unit 40 sets the value of the calculated variable parameter ρ to the position controller 83 (S150), and thus the setting value of the variable parameter ρ in the position controller 83 is updated. Furthermore, the value of the calculated variable parameter ρ is stored as the setting value of the variable parameter ρ in the NVRAM 47, and the tuning processing is completed.

Figure 7:
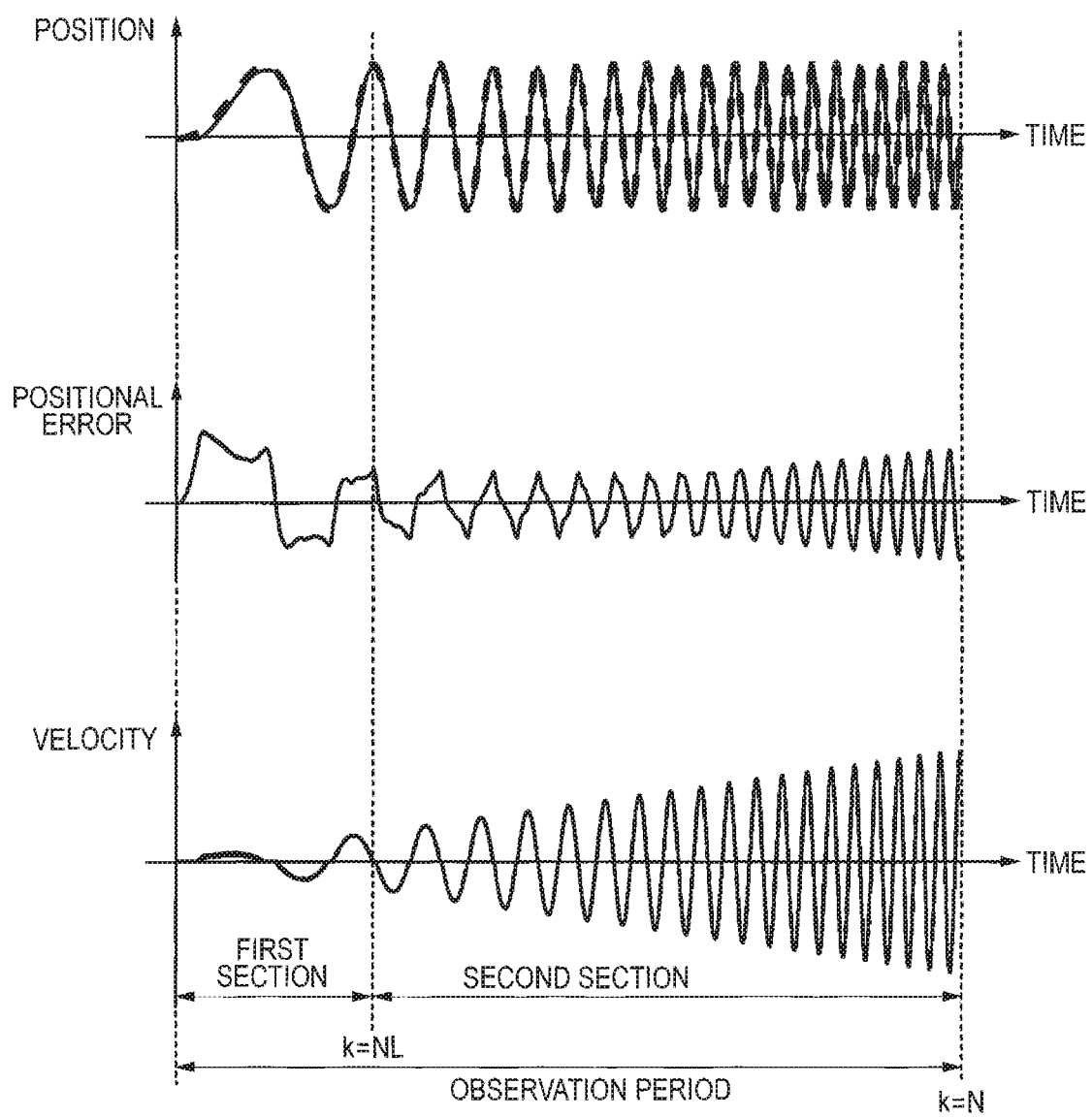
FIG. 7 is a graph showing the rotational position of a conveyance roller, the error of the rotational position from a target response and the locus of a rotational velocity in test conveyance.

Specifically, in S110 and S120, the control of the conveyance roller 31 is performed according to a target position locus indicated by a broken line in the upper stage of FIG. 7, and thus the observation data is acquired. A graph shown in the upper stage of FIG. 7 is a graph of the rotational position y of the conveyance roller 31, the target position locus is indicated by the thick broken line and the rotational position ym obtained by the control according to the target position locus is indicated by a solid line.

The target position locus has a sinusoidal shape in which its cycle is gradually reduced. In the control according to the target position locus, as shown in the lower stage of FIG. 7, the conveyance roller 31 is operated so as to repeat forward and reverse rotation while gradually increasing the rotational velocity v. A graph shown in the lower stage of FIG. 7 is a graph which indicates the rotational velocity vm obtained by the control according to the target position locus.

A graph shown in the middle stage of FIG. 7 is a graph which indicates a positional error (ym−yr), that is a deviation (ym−yr) of the rotational position ym obtained by the control according to the target position locus from the target response yr=T·r. As is understood from the graph, the positional error (ym−yr) tends to be increased at a lower velocity due to the influence of the frictional force F. At a low velocity, a complicated change in the frictional force caused by the Stribeck effect significantly affects the accuracy of the control so as to reduce the accuracy.

In a related technology, although the nonlinear frictional force F which causes a significant temporary variation as described above is present, the control error is evaluated in the entire observation period, and the setting value of the variable parameter ρ is updated such that the control error is minimized. In other words, in the related technology, the evaluation function J is formed with only the first function part J1 of the present embodiment. Hence, in the related technology, it is difficult to accurately identify the transfer function C(ρ) of the control target and to appropriately update the setting value of the variable parameter ρ.

By contrast, in the present embodiment, the second function part J2 is provided in the evaluation function J. Thus, by searching for the value of the variable parameter ρ in which the output value of the evaluation function J is minimized, the value of the variable parameter ρ which reduces the control error in a low velocity section where the control error tends to be increased can be found, together with the entire error. Thus, the setting value of the variable parameter ρ is updated so as to reduce the control error in the entire observation period and the low velocity section.

Figure 8:
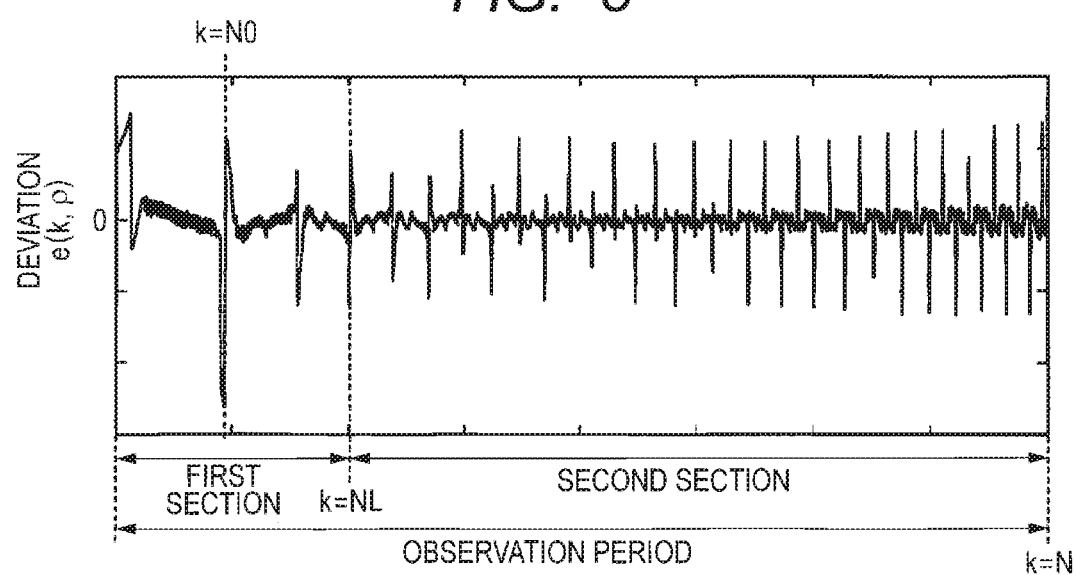
FIG. 8 is a graph showing changes in the deviation of an observation value from a reference value.

For example, depending on the influence of the frictional force F, as shown in FIG. 8, the deviation e (k, ρ) temporarily appears large in the low velocity section. FIG. 8 is a graph showing changes in the deviation e (k, ρ) in the observation period.

In the control system in which the deviation e (k, ρ) is characterized as described above, the observation period from the time k=1 to the time k=N is divided into a first section from the time k=1 to a time k=NL which corresponds to the low velocity section and a second section from a time k=NL+1 to the time k=N which corresponds to a high velocity section. And, the second function part J2 is defined according to the following formula. In this way, the setting value of the variable parameter ρ can be updated with consideration given to the sectional error in one of the low velocity section and the high velocity section which has a larger sectional error.

$$J2 = \max\left\{\frac{1}{NL}\sum_{k=1}^{k=NL} e(k,\rho)^2, \frac{1}{N-NL}\sum_{k=NL+1}^{k=N} e(k,\rho)^2\right\}$$

However, since a section in which the control error is increased is basically the low velocity section, as another example, the second function part J2 may be defined as follows.

$$J2 = \frac{1}{NL}\sum_{k=1}^{k=NL} e(k,\rho)^2$$

In other words, the second function part J2 may be configured to calculate the control error in the low velocity section of the observation period in which the control error caused by the frictional force is increased. As described above, the second function part J2 is defined as the mean square of the deviation e (k, ρ) in a specific section, and thus the efficiency of computation of the evaluation function J and the efficiency with which the variable parameter ρ for minimizing the evaluation function J is searched for are enhanced. On the other hand, if a max function is used as the second function part J2, the versatility and adaptability of the evaluation function J are enhanced.

Furthermore, in the present embodiment, due to the third function part J3, the setting value of the variable parameter ρ is updated with consideration given to the deviation e (k, ρ) at a time k=NO when the absolute value | e (k, ρ) | of the deviation e (k, ρ) is maximum in the observation period. Hence, in the present embodiment, the setting value of the variable parameter ρ is appropriately updated so as to reduce a control error caused by a nonlinear frictional force appearing in the low velocity section.

Figure 9:
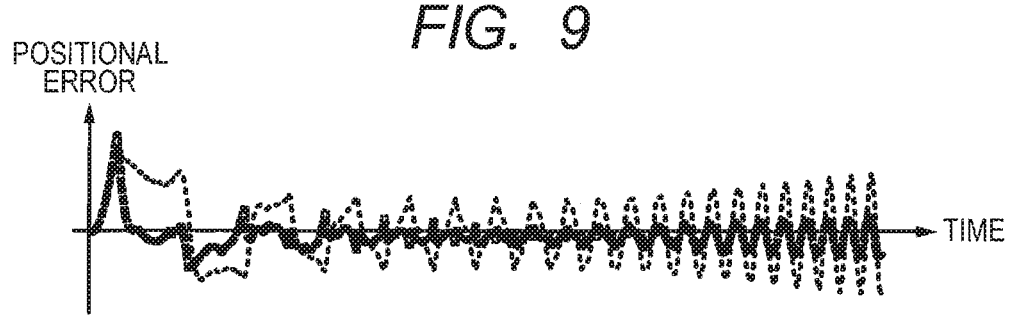
FIG. 9 is a graph showing changes in the error of the rotational position from the target response after parameter updating.

The improvement of the control error when the variable parameter ρ is updated by the method of the present embodiment is understood from a graph shown in FIG. 9. A thin broken line in FIG. 9 corresponds to the positional error (ym−yr) shown in the middle stage of FIG. 7. A thick broken line in FIG. 9 indicates the positional error (ym−yr) that is improved after the setting value of the variable parameter ρ is updated according to the evaluation function J of the present embodiment, under conditions in which the positional error (ym−yr) indicated by the thin broken line is produced. In other words, the thick broken line indicates the positional error (ym−yr) when a similar conveyance test as in S110 is performed after updating the variable parameter ρ.

Figure 10:
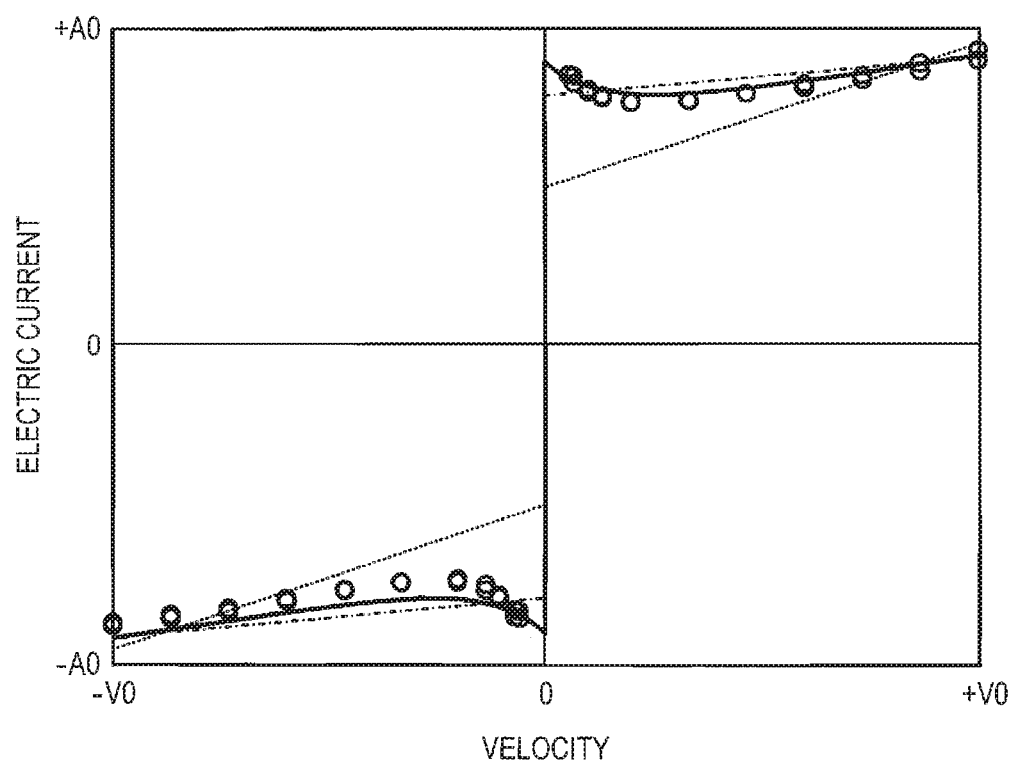
FIG. 10 is a graph of velocity versus electric current.

The improvement of the control error which is produced by updating the setting value of the variable parameter ρ with the method of the present embodiment will further be described from another aspect with reference to FIG. 10. FIG. 10 shows a relationship between the rotational velocity v of the conveyance roller 31 and an electric current (current) applied to the PF motor 71 with a graph of velocity versus current. In FIG. 10, the plot of white circles is a proper velocity versus current curve which is found in another test.

A curve indicated by a solid line in FIG. 10 is a velocity versus current curve of the transfer function C(ρ) according to the variable parameter ρ updated by the method of the present embodiment. A broken line is a velocity versus current curve of the transfer function C(ρ) according to the variable parameter ρ before being updated. A single-dot chain line is a velocity versus current curve of the transfer function C(ρ) according to the variable parameter ρ updated by the related method. As described above, by using the evaluation function J of the present embodiment, the transfer function of the control target is accurately identified, and appropriate updating of the variable parameter ρ for reducing the control error is realized.

According to the embodiment described above, by calculating values of the variable parameters that minimize the output value, the parameters of the controller can be updated appropriately with consideration given to both an entire control error and a control error which occurs due to a temporary cause.

Although the parameter updating method of the embodiment is described above, this disclosure is not limited to the embodiment described above, and various modifications are adopted.

For example, the evaluation function J may be changed to the sum of weights of the first function part J1, the second function part J2, and the third function part J3.

$$J = \lambda_1 \cdot J_1 + \lambda_2 \cdot J_2 + \lambda_3 \cdot J_3$$

For example, when the updating of the variable parameter ρ based on the overall tendency of the control error is prioritized, the setting of λ1=2, λ2=1 and λ3=1 is considered. By the sum of weights, the variable parameter ρ can be updated while one or more of the overall tendency of the control error, the sectional tendency, and the instantaneous tendency are prioritized according to the characteristic of the control error and the necessary accuracy of the control.

Moreover, the evaluation function J may be defined in a form in which the third function part J3 is not included (J=J1+J2) or may be defined in a form in which the second function part J2 is not included (J=J1+J3). A conception of the sum of weights is similarly applied to these evaluation functions J.

The observation period may be divided into a plurality of sections with reference to the time point when a target position, a target velocity, a target acceleration and the like are discontinuous. The second function part J2 may be configured to output, as the sectional error, the mean square of a section in which the mean square of the deviation e (k, ρ) is maximum among these sections.

For example, the rotational position y may be controlled according to a target position locus shown in the upper stage of FIG. 11 at the time of the conveyance test in S110. In this case, with reference to the times k=N1, N2 and N3 when a target acceleration locus which is the second order differential of the target position locus as shown in the lower stage of FIG. 11 is discontinuous, the observation period may be divided into a first section from the time k=1 to the time k=N1, a second section from the time k=N1+1 to the time k=N2, a third section from a time k=N2+1 to a time k=N3, and a fourth section from a time k=N3+1 to a time k=N. The second function part J2 may be defined by the following formula.

$$J2 = \max\left\{\frac{1}{N1}\sum_{k=1}^{k=N1} e(k,\rho)^2, \frac{1}{N2-N1}\sum_{k=N1+1}^{k=N2} e(k,\rho)^2, \frac{1}{N3-N2}\sum_{k=N2+1}^{k=N3} e(k,\rho)^2, \frac{1}{N-N3}\sum_{k=N3+1}^{k=N} e(k,\rho)^2\right\}$$

The observation period may be equally divided, and the second function part J2 may be configured to output, as the sectional error, the mean square of a section in which the mean square of the deviation e (k, ρ) is maximum among the equally-divided sections. By the method of equally dividing the observation period so as to define the second function part J2, the versatile evaluation function J is defined. By this method, even when it is impossible to predict at what point in time the control error is produced, the variable parameter ρ is accurately updated.

Although the dimensions of the function parts J1, J2 and J3 in the evaluation function J are unified into a dimension corresponding to the square of the deviation, a configuration may be adopted in which these dimensions are not unified. The first function part J1 and the second function part J2 may be configured such that instead of the mean square, the arithmetic average of the absolute value of the deviation e (k, ρ) is calculated as the control error. The third function part J3 may be configured such that the maximum value of the absolute value of the deviation e (k, ρ) is calculated as the instantaneous error. By unifying the dimensions of the function parts J1, J2 and J3 in the evaluation function J, it is easy to calculate the evaluation function and to design the weights.

In the embodiment described above, the technology of VRFT is applied, and the deviation e (k, ρ) is defined as a deviation of the observation value um of the control input from the reference value ur. Instead of the VRFT, the technology of FRIT may be applied. In this case, the deviation e (k, ρ) may be calculated as a deviation of the observation value ym of the control output from the reference value of the control output corresponding to the observation value um of the control input.

The technology of updating the variable parameter ρ based on the evaluation function J in the present embodiment may be applied to the control system of the paper feeder 60 in the image forming system 1. The technology of updating the variable parameter ρ based on the evaluation function J is also applied to a control system other than the image forming system 1.

The function of the parameter updater 49 which is realized by the execution of a program by the main unit 40 may be realized by dedicated hardware. The function of the parameter updater 49 may be incorporated into an information processing apparatus which is independent of the control system. In this case, the information processing apparatus acquires the observation data of the control system and calculates the appropriate value of the variable parameter ρ.

While the disclosure has been described in detail with reference to the above aspects thereof, it would be apparent to those skilled in the art that various changes and modifications may be made therein without departing from the scope of the claims.

What is claimed is:
1. A parameter updating method comprising:
acquiring time-series data of a control input and a control output that are observed when a controlled object is controlled by a controller, the controller being config- ured to calculate, based on the control output, the control input following a particular transfer function having a variable parameter and to control the controlled object based on the control input;

calculating a value of the variable parameter that minimizes an output value of an evaluation function relating to a control error, based on an observation value of the control input and an observation value of the control output at each time in an observation period identified from the acquired time-series data; and updating a setting value of the variable parameter with the calculated value of the variable parameter, wherein the evaluation function includes:

a first function part configured to evaluate an entire error that is a control error of an entirety of the observation period based on the observation value at each time in the observation period and to increase the output value as the entire error increases;

a second function part configured to evaluate a sectional error that is a control error of a particular section in the observation period based on the observation value at each time in the particular section and to increase the output value as the sectional error increases; and a third function part configured to evaluate an instantaneous error that is a control error of a particular time point in the observation period based on the observation value at the particular time point and to increase the output value as the instantaneous error increases, wherein the entire error, the sectional error, and the instantaneous error are evaluated based on deviations of the observation value from a reference value;

wherein the entire error corresponds to an average of deviations of the observation value from the reference value in the observation period;

wherein the method further comprises:

dividing the observation period into a plurality of sections; and calculating an average of deviations of the observation value from the reference value in each of the plurality of sections;

wherein the sectional error corresponds to the average of the deviations in one section, the one section being one of the plurality of sections and having a maximum value among a plurality of averages of deviations of the plurality of sections;

wherein the controller is configured to:

based on a value (r−δ) obtained by correcting a desired value r by a difference δ=ym−yr between an observation value ym of the control output y and a corresponding target response yr, calculate a control input u following a relational expression u=$H^{-1}T(r-δ)$+Fr including: a target response function T defining the target response yr; an inverse model $H^{-1}$ of a transfer function H of the controlled object, the transfer function H including the variable parameter ρ; and an estimation model Fr of frictional force that acts on the controlled object; and control the controlled object based on the control input u; and wherein the deviation is a deviation e=um−ur of an observation value um of the control input u from a reference value ur=$H^{-1}$ym+Fr of the control input u corresponding to an observation value ym of the control output y.

2. The parameter updating method according to claim 1, wherein the particular transfer function includes an estimation model of frictional force that acts on the controlled object;

wherein the particular section is a low velocity section of the observation period in which the control error caused by the frictional force is increased; and wherein the sectional error corresponds to an average of deviations of the observation value from a reference value in the particular section.

3. The parameter updating method according to claim 1, wherein the evaluation function includes the third function part;

wherein the particular time point is a time point at which a deviation of the observation value from a reference value in the observation period indicates a maximum value; and wherein the instantaneous error corresponds to the maximum value of deviations of the observation value from the reference value in the observation period.

4. The parameter updating method according to claim 1, wherein the deviation is a deviation of an observation value of the control input from a reference value of the control input, the reference value of the control input being calculated based on an observation value of the control output, the reference value of the control input corresponding to the observation value of the control output.

5. The parameter updating method according to claim 1, wherein the evaluation function outputs a value corresponding to a weighted sum of the entire error, the sectional error, and the instantaneous error.

6. A parameter updating system comprising:

a processor configured to perform:

acquiring time-series data of a control input and a control output that are observed when a controlled object is controlled by a controller, the controller being configured to calculate, based on the control output, the control input following a particular transfer function having a variable parameter and to control the controlled object based on the control input;

calculating a value of the variable parameter that minimizes an output value of an evaluation function relating to a control error, based on an observation value of the control input and an observation value of the control output at each time in an observation period identified from the acquired time-series data; and updating a setting value of the variable parameter with the calculated value of the variable parameter, wherein the evaluation function includes:

a first function part configured to evaluate an entire error that is a control error of an entirety of the observation period based on the observation value at each time in the observation period and to increase the output value as the entire error increases;

a second function part configured to evaluate a sectional error that is a control error of a particular section in the observation period based on the observation value at each time in the particular section and to increase the output value as the sectional error increases; and a third function part configured to evaluate an instantaneous error that is a control error of a particular time point in the observation period based on the observation value at the particular time point and to increase the output value as the instantaneous error increases, wherein the entire error, the sectional error, and the instantaneous error are evaluated based on deviations of the observation value from a reference value;

wherein the entire error corresponds to an average of deviations of the observation value from the reference value in the observation period;

wherein the processor further performs:
dividing the observation period into a plurality of sections; and
calculating an average of deviations of the observation value from the reference value in each of the plurality of sections;

wherein the sectional error corresponds to the average of the deviations in one section, the one section being one of the plurality of sections and having a maximum value among a plurality of averages of deviations of the plurality of sections; and wherein the controller is configured to:
based on a value (r−δ) obtained by correcting a desired value r by a difference δ=ym−yr between an observation value ym of the control output y and a corresponding target response yr, calculate a control input u following a relational expression u=$H^{-1}$T(r−δ)+Fr including: a target response function T defining the target response yr; an inverse model $H^{-1}$ of a transfer function H of the controlled object, the transfer function H including the variable parameter ρ; and an estimation model Fr of frictional force that acts on the controlled object; and
control the controlled object based on the control input u; and wherein the deviation is a deviation e=um−ur of an observation value urn of the control input u from a reference value ur=$H^{-1}$ym+Fr of the control input u corresponding to an observation value ym of the control output y.

7. A non-transitory computer-readable storage medium storing a program executable on a computer, the program causing, when executed, the computer to perform operations comprising:

acquiring time-series data of a control input and a control output that are observed when a controlled object is controlled by a controller, the controller being configured to calculate, based on the control output, the control input following a particular transfer function having a variable parameter and to control the controlled object based on the control input;

calculating a value of the variable parameter that minimizes an output value of an evaluation function relating to a control error, based on an observation value of the control input and an observation value of the control output at each time in an observation period identified from the acquired time-series data; and updating a setting value of the variable parameter with the calculated value of the variable parameter, wherein the evaluation function includes:
a first function part configured to evaluate an entire error that is a control error of an entirety of the observation period based on the observation value at each time in the observation period and to increase the output value as the entire error increases;
a second function part configured to evaluate a sectional error that is a control error of a particular section in the observation period based on the observation value at each time in the particular section and to increase the output value as the sectional error increases; and
a third function part configured to evaluate an instantaneous error that is a control error of a particular time point in the observation period based on the observation value at the particular time point and to increase the output value as the instantaneous error increases, wherein the entire error, the sectional error, and the instantaneous error are evaluated based on deviations of the observation value from a reference value;

wherein the entire error corresponds to an average of deviations of the observation value from the reference value in the observation period;

wherein the operations further comprise:
dividing the observation period into a plurality of sections; and
calculating an average of deviations of the observation value from the reference value in each of the plurality of sections;

wherein the sectional error corresponds to the average of the deviations in one section, the one section being one of the plurality of sections and having a maximum value among a plurality of averages of deviations of the plurality of sections; and wherein the controller is configured to:
based on a value (r−δ) obtained by correcting a desired value r by a difference δ=ym−yr between an observation value ym of the control output y and a corresponding target response yr, calculate a control input u following a relational expression u=$H^{-1}$T(r−δ)+Fr including: a target response function T defining the target response yr; an inverse model $H^{-1}$ of a transfer function H of the controlled object, the transfer function H including the variable parameter ρ; and an estimation model Fr of frictional force that acts on the controlled object; and
control the controlled object based on the control input u; and wherein the deviation is a deviation e=um−ur of an observation value urn of the control input u from a reference value ur=$H^{-1}$ym+Fr of the control input u corresponding to an observation value ym of the control output y.

8. A parameter updating method comprising:
acquiring time-series data of a control input and a control output that are observed when a controlled object is controlled by a controller, the controller being configured to calculate, based on the control output, the control input following a particular transfer function having a variable parameter and to control the controlled object based on the control input;

calculating a value of the variable parameter that minimizes an output value of an evaluation function relating to a control error, based on an observation value of the control input and an observation value of the control output at each time in an observation period identified from the acquired time-series data; and updating a setting value of the variable parameter with the calculated value of the variable parameter, wherein the evaluation function includes:
a first function part configured to evaluate an entire error that is a control error of an entirety of the observation period based on the observation value at each time in the observation period and to increase the output value as the entire error increases; and at least one of:
- a second function part configured to evaluate a sectional error that is a control error of a particular section in the observation period based on the observation value at each time in the particular section and to increase the output value as the sectional error increases; and
- a third function part configured to evaluate an instantaneous error that is a control error of a particular time point in the observation period based on the observation value at the particular time point and to increase the output value as the instantaneous error increases, wherein the entire error, the sectional error, and the instantaneous error are evaluated based on deviations of the observation value from a reference value;

wherein the controller is configured to:
based on a value (r−δ) obtained by correcting a desired value r by a difference δ=ym−yr between an observation value ym of the control output y and a corresponding target response yr, calculate a control input u following a relational expression u=$H^{-1}$T(r−δ)+Fr including: a target response function T defining the target response yr; an inverse model $H^{-1}$ of a transfer function H of the controlled object, the transfer function H including the variable parameter ρ; and an estimation model Fr of frictional force that acts on the controlled object; and control the controlled object based on the control input u; and wherein the deviation is a deviation e=um−ur of an observation value um of the control input u from a reference value ur=$H^{-1}$ym+Fr of the control input u corresponding to an observation value ym of the control output y.

\* \* \* \* \*